US012128530B2

(12) United States Patent
Bergmann et al.

(10) Patent No.: US 12,128,530 B2
(45) Date of Patent: Oct. 29, 2024

(54) SCREW DEVICE HAVING INTEGRATED DETECTION MEANS

(71) Applicant: Johannes Lübbering GmbH, Herzebrock-Clarholz (DE)

(72) Inventors: Bruno Bergmann, Gütersloh (DE); Johannes Petermann, Herzebrock-Clarholz (DE); Achim Lübbering, Herzebrock-Clarholz (DE)

(73) Assignee: Johannes Lübbering GmbH, Herzebrock-Clarholz (DE)

( * ) Notice: Subject to any disclaimer, the term of this patent is extended or adjusted under 35 U.S.C. 154(b) by 98 days.

(21) Appl. No.: 17/631,671

(22) PCT Filed: Jun. 18, 2020

(86) PCT No.: PCT/EP2020/066949
§ 371 (c)(1),
(2) Date: Jan. 31, 2022

(87) PCT Pub. No.: WO2021/023422
PCT Pub. Date: Feb. 11, 2021

(65) Prior Publication Data

US 2022/0274232 A1 Sep. 1, 2022

(30) Foreign Application Priority Data

Aug. 2, 2019 (EP) .................................... 19189731

(51) Int. Cl.
*B25B 13/48* (2006.01)
*B25B 17/02* (2006.01)
*B25B 23/142* (2006.01)

(52) U.S. Cl.
CPC ............ *B25B 13/481* (2013.01); *B25B 17/02* (2013.01); *B25B 23/1425* (2013.01)

(58) Field of Classification Search
CPC ............ B25B 23/1425; B25B 23/1422; B25B 23/147; B25B 23/1475; B25B 17/02;
(Continued)

(56) References Cited

U.S. PATENT DOCUMENTS 2,830,479 A * 4/1958 Finn ........................ B25B 17/00 81/57.3
3,987,691 A * 10/1976 Savage ................ B25B 13/481 81/57.3
(Continued)

FOREIGN PATENT DOCUMENTS

CN 108081189 A1 5/2018
DE 102017119676 A1 2/2019
(Continued)

OTHER PUBLICATIONS

International search report for patent application No. PCT/EP2020/066949 dated Oct. 14, 2020.
(Continued)

*Primary Examiner* — Dariush Seif
(74) *Attorney, Agent, or Firm* — Bachman & LaPointe, P.C.

(57) ABSTRACT

A screw device (10) for applying a torque to a screw partner (20), includes a flat output assembly (1) having an output (1*b*) detachably connected to the screw partner (20) and a drive (1*a*), to which a drive torque can be manually or mechanically applied. A detection assembly (5) for providing measurement values for determining and/or monitoring an output torque acting on the screw partner on the output side, is provided in a housing (30) of the flat output assembly (1) and can detect a radial a force and/or a tangential force acting on a gearwheel (4*d*) which connects the drive and the
(Continued)

output of the flat output assembly (1) in a torque-transmitting manner, and provides same for electronic signal evaluation.

17 Claims, 4 Drawing Sheets

(58) Field of Classification Search
CPC ......... B25B 17/00; B25B 13/04; B25B 13/08; B25B 13/481; B25B 13/467; B25B 21/002
USPC ......................................... 173/176, 181, 183
See application file for complete search history.

(56) References Cited

U.S. PATENT DOCUMENTS 3,995,477 A * 12/1976 Almond .............. B25B 23/1425 73/862.26
4,006,629 A * 2/1977 Barrett ................ B25B 23/1425 73/862.26
4,063,475 A * 12/1977 Perkins ................... B25B 17/00 81/57.3
4,374,479 A * 2/1983 Minotti ................. B25B 23/101 81/57.3
4,506,567 A * 3/1985 Makhlouf ............. B25B 13/107 81/57.3
4,649,776 A * 3/1987 Puncochar .............. B25B 17/00 81/57.3
4,825,729 A * 5/1989 Puncochar ............ B25B 13/481 81/57.3
4,827,809 A * 5/1989 Broemel, Jr. ......... B25B 13/481 81/57.3
4,928,558 A * 5/1990 Makhlouf ............... B25B 17/00 81/57.3
5,107,729 A * 4/1992 Makhlouf ........... B25B 13/5016 81/57.3
5,172,616 A * 12/1992 Negishi ............... B25B 23/1425 81/479
5,544,553 A * 8/1996 Galat ..................... B25B 13/481 81/57.3
D381,878 S * 8/1997 Smith .............................. D8/25
5,732,605 A * 3/1998 Mann ...................... B25B 23/00 81/DIG. 11
6,035,745 A * 3/2000 Kather .................. B25B 21/002 81/57.13
6,832,531 B1 * 12/2004 Marquardt ............ B25B 21/002 81/57.3
6,928,885 B1 * 8/2005 Shiao .................. B25B 23/1425 73/862.21
6,948,380 B1 * 9/2005 Shiao .................... B25B 13/461 73/862.21
7,703,356 B2 * 4/2010 Bass ....................... B25B 17/00 81/177.8
7,721,627 B2 * 5/2010 Basham .................... B25C 7/00 81/57.3
7,827,885 B2 * 11/2010 Rowell ................. B25B 13/481 81/57.3
8,302,702 B2 11/2012 Hansson et al.
10,960,521 B2 * 3/2021 Bergan .................. B25B 21/007
11,161,226 B2 * 11/2021 Sawa .................... B25B 21/004
2004/0093992 A1 * 5/2004 Wojtynek .............. B25B 13/467 81/57.3
2009/0205848 A1 * 8/2009 Wilson, Jr. .............. B25B 21/00 173/1
2010/0269646 A1 10/2010 Le Du et al.
2012/0103142 A1 * 5/2012 Sroka ...................... B25B 17/02 81/57.3
2012/0312132 A1 * 12/2012 Li ....................... B25B 23/1425 81/479
2013/0032007 A1 * 2/2013 Chen ....................... B25B 17/00 81/57.32
2013/0074658 A1 * 3/2013 Bowens ................ B25B 13/481 173/1
2013/0139651 A1 * 6/2013 Taylor ..................... B25B 21/00 173/1
2013/0233131 A1 * 9/2013 Badiali ............... B25B 23/0028 81/57.3
2015/0209943 A1 * 7/2015 Noel ....................... B25B 17/00 81/57.24
2015/0273667 A1 * 10/2015 Hielscher ................ B25B 13/48 81/57.22
2015/0314427 A1 * 11/2015 Carlsson ............... B25B 13/481 81/57.3
2017/0057057 A1 * 3/2017 Wilson, Jr. et al. ..... B25B 17/02
2017/0097269 A1 * 4/2017 Liang .................... G01L 3/1471
2017/0239793 A1 * 8/2017 Perndl ..................... B25B 17/02
2018/0021929 A1 * 1/2018 Hyust ................... B25B 13/481 81/60
2018/0051774 A1 * 2/2018 Campbell ............... B25B 17/00
2018/0117746 A1 * 5/2018 Forsberg ................. B25B 21/00
2018/0147700 A1 * 5/2018 Tajudeen .............. B25B 13/481
2019/0029901 A1 1/2019 Nahavandi
2019/0039215 A1 * 2/2019 Barzelay ............. B25B 23/1425
2019/0061075 A1 2/2019 Hohmann et al.
2019/0210201 A1 * 7/2019 Flath ....................... B25B 13/06
2020/0061780 A1 * 2/2020 Langhorst ............... B25B 17/00
2021/0276163 A1 * 9/2021 Eriksson ............... B25B 21/007
2021/0316427 A1 * 10/2021 Langhorst ............. B25B 13/481
2022/0274232 A1 * 9/2022 Bergmann .............. B25B 17/00
2023/0073344 A1 * 3/2023 Newcomb ............... B25B 13/36
2023/0347479 A1 * 11/2023 Osawa .................... H02P 23/14

FOREIGN PATENT DOCUMENTS

EP 3388199 A1 * 10/2018 ............ B25B 13/48
GB 2383282 A 6/2003
JP 07040261 A 2/1995
JP 2010532718 A 10/2010
JP 2017072576 A 4/2017
KR 20180014858 A 2/2018
WO 2008128525 A2 10/2008
WO 2009005435 A1 1/2009
WO 2014144532 A1 9/2014
WO 2018188829 A1 10/2018

OTHER PUBLICATIONS

Conor S. Boland et al., Sensitive electromechanical sensors using viscoelastic graphene-polymer nanocomposites, SCIENCE sciencemag.org, Dec. 9, 2016, vol. 354, Issue 6317, pp. 1257-1260.

* cited by examiner

SCREW DEVICE HAVING INTEGRATED DETECTION MEANS

BACKGROUND OF THE INVENTION

The present invention relates to a screwing device for applying a torque to a screw partner, the screwing device having integrated detection means for an output torque.

From the state of the art, in particular the industrial screwing technology, screwing devices having geared offset head means are generally known. They are gear units—usually accommodated in a flat housing—which have a drive which is usually provided at one end and an output which is provided at the opposite end and at which a screw partner, such as a screw to which a torque is to be applied, can be applied, preferably in a detachable manner. Such screwing devices are used in particular in screwing and assembly work in which a screw partner is hard to reach because of spatial installation conditions.

The detection or monitoring of an output torque acting on the respective screw partner on the output side is desired for reasons of quality assurance or for documentation purposes especially in the industrial application. A generic screwing device is already known from WO 2018/188829 A1. It discloses detection means which are assigned to the geared offset head means and which detect an axial force acting on a helical gearwheel of the geared offset head means, the output torque acting on a screw partner on the output side thus being determinable. However, additional axial bearings are to be provided for such a determination by means of an evaluation of the detected axial forces, which increases the design complexity of the structural arrangement in the geared offset head means. The known detection means also require additional installation space in the geared offset head means.

SUMMARY OF THE INVENTION

Based on the known state of the art, the object of the present invention is to provide an improved screwing device which overcomes or at least significantly reduces the disadvantages of the state of the art mentioned above. In particular a screwing device having alternative means for determining and/or monitoring the torque acting on a screw partner on the output side while at the same time allowing a cost-efficient and compact design of the geared offset head is to be provided. Additionally, a reliable torque determination and/or monitoring is to be enabled. Moreover, the invention addresses other problems which are described in more detail in the following description.

The underlying object is attained by the screwing device for applying a torque to a screw partner having the features disclosed herein. Advantageous embodiments of the invention are described herein and in the dependent claims.

A first aspect of the invention relates to a screwing device for applying a torque to a screw partner, the screwing device comprising geared offset head means having an output which can be connected to the screw partner in a detachable manner and a drive to which a drive torque can be manually or mechanically applied, preferably via an intermediate angle and/or bevel gearing, and detection means for providing measurement values for determining and/or monitoring an output torque acting on the screw partner on the output side, characterized in that the detection means provided in a housing of the geared offset head means are configured in such a manner that they can detect a radial force and/or a tangential force which acts on a preferably straight-toothed gearwheel which connects the drive and the output of the geared offset head means in a torque-transmitting manner and that the detection means can provide the radial and/or tangential force for preferably electronic signal evaluation.

The configuration of the detection means according to the invention, which are integrated in the housing of the geared offset head means and which detect a radial force and/or a tangential force or a circumferential force of a gearwheel interacting with the detection means in the geared offset head means, provides a simple design solution for the reliable provision of measurement values for determining and/or monitoring the output torque acting on a screw partner on the output side. In particular the required installation space in the geared offset head means can be minimized compared to the known state of the art. Furthermore, the configuration of the screwing device according to the invention allows cost-efficient production and simplified maintenance. Moreover, the efficiency of the geared offset head means is increased in a provided straight tooth gearing of the gearwheel interacting with the detection means. The measurement values mentioned above for determining and/or monitoring the output torque preferably refer to the radial force and/or the tangential force detected by the detection means or to measurement values or measurement value signals representing them.

Especially the design simplicity of the present invention for generating an electronically evaluable signal allows the compact and cost-efficient realization of an (electronic) interface functionality for a standardized external evaluability and/or a (preferably wireless) signal transmission to the outside using miniaturized electronic components. Especially the electrical energy supply means provided according to an embodiment within the scope of the invention for such electronic interface or signal processing means allow such a wireless, self-sufficient and accordingly flexible functionality, wherein, in addition to a battery solution for the electrical energy supply means, for example, an electrical generator solution may also be an option in an additional embodiment; said generator solution, which advantageously uses the rotations of the gear components involved which inevitably occur in the screwing device according to the invention, can convert this mechanical kinetic energy into electrical operating energy for the functionalities described above in a generally known manner. The resulting advantage of an independence from batteries or other wired energy sources is also obvious.

The described radial and/or tangential force acting at the gearwheel refers to a respective radial force and/or tangential force at the gearwheel which is applied to the gearwheel, in particular during an operative connection with other gearwheels or gearings meshing with said gearwheel. The radial and/or tangential force acting at the gearwheel refers in particular to a bearing reaction force of the gearwheel in the radial and/or tangential direction which can be detected by the detection means. Preferably, the respective radial force and/or tangential force which is applied to the bearing or to a rotation axis of the gearwheel, which is preferably fixed in the housing, when torque is transmitted at the gearwheel which is connected to the detection means is detected in this process. Here, the radial force and/or the tangential force refers preferably to a force in a plane which is essentially perpendicular to the rotation axis of the gearwheel and/or to the main axis of the geared offset head.

In a particularly preferred exemplary embodiment, the detection means are configured in such a manner that they detect a radial force in or along a line of action in which the tangential or circumferential forces applied to the gearwheel, which preferably act in the same direction, are combined or can be combined to obtain a resulting force. The radial force detected in this process is a force which is applied to the gearwheel or a bearing reaction force of the gearwheel.

If the gearwheel interacting with the detection means according to the invention is straight-toothed, solely a rotatory force is preferably introduced into the gearwheel and solely radial and/or tangential forces thus act on the gearwheel when it is in operative connection or interaction with other gearwheels or gearings of the geared offset head means meshing with said gearwheel. Preferably, no axial forces, i.e., forces along a rotation axis of the gearwheel, occur. Here, a measurement value signal representing and/or monitoring the torque on the output side in a reliable manner can be provided by the detection means for preferably electronic signal evaluation.

If the gearwheel interacting with the detection means according to the invention has a helical gearing or is a helical gearwheel, axial forces on the gearwheel or bearing reaction forces acting in the axial direction occur in addition to radial and/or tangential forces. Said additional forces are preferably not detected by the detection means according to the invention. Nevertheless, a measurement value signal monitoring the torque on the output side in a reliable manner can be provided by the detection means for preferably electronic signal evaluation. In particular, a deviation of the detected radial and/or tangential forces allows the conclusion that the torque on the output side deviates.

In a preferred embodiment, the gearwheel interacting with the detection means according to the invention is disposed between a drive assembly of the geared offset head means comprising a gearing and an output assembly of the geared offset head means comprising a gearing. In this embodiment, the gearwheel interacting with the detection means according to the invention is preferably configured as a gearwheel which directly interacts or meshes with the output assembly. Alternatively, the output assembly can directly comprise the gearwheel interacting with the detection means according to the invention. For example, the straight-toothed gearwheel itself can form the output assembly of the geared offset head means. Both variants can thus realize a substantial advantage according to the invention, namely the measurement value detection according to the invention by the detection means as close as possible on the side of the output of the geared offset head means.

In a preferred embodiment, the geared offset head means comprise a plurality of gearwheels which form a gear arrangement between the drive and the output of the geared offset head means. In this embodiment, the gearwheel interacting with the detection means according to the invention is preferably one of the gearwheels forming the gear arrangement. The gear arrangement can comprise a straight tooth gearing or a helical gearing. The gear arrangement can also comprise an angle, bevel and/or spiral gearing.

In a preferred embodiment, the geared offset head means comprise a plurality of, i.e., at least two, preferably at least three, straight-toothed or helical gearwheels. Particularly preferably, the geared offset head means comprise exclusively straight-toothed gearwheels. Alternatively, however, the geared offset head means can also comprise at least partially helical gearwheels. All rotation axes of the gearwheels of the geared offset head means preferably extend in one plane. The rotation axes preferably extend parallel to one another and extend through flat sides of the housing of the geared offset head.

The housing of the geared offset head preferably has two parallel flat sides or opposite plane outer surfaces. Preferably, these do not have protrusions or elevations. The housing is preferably composed of two parts and has two opposite halves. The maximal width of the housing is preferably smaller than 30 mm, more preferably smaller than 20 mm.

The gearwheel interacting with the detection means preferably comprises a bearing axis which is fixed in the housing, in particular in a non-rotatable manner, and on which a ring gear of the gearwheel is mounted so as to be freely rotatable, preferably by means of a needle bearing.

The detection means preferably comprise at least one force transducer. Preferably, said force transducer is firmly connected to, in particular in a non-rotatable manner, or formed integrally with a bearing or with the bearing axis of the gearwheel. Here, the force transducer is disposed between the bearing axis and the housing of the geared offset head means, preferably in a non-rotatable manner. Here, the force transducer can be secured against rotation relative to the housing in a housing cover recess by means of an appropriate pin connection to a housing cover and/or by means of a corresponding shaping.

The force transducer is preferably disposed in a line of action of the resulting force applied to the gearwheel, the line of action extending radially to the gearwheel. Preferably, this is a force which acts radially and in which the tangential or circumferential forces applied to the gearwheel, which preferably act in the same direction, are combined or can be combined to obtain a resulting force. In particular, the force transducer is preferably disposed in such a manner that it can detect a radial force in or along a line of action.

The force transducer is preferably realized in the form of a spoke wheel and/or is preferably essentially disk-shaped. The force transducer is preferably made of the same material as the assigned gearwheel and/or as the bearing axis of the gearwheel. The force transducer is preferably formed or disposed on an end face of the gearwheel. In particular, the force transducer can be disposed directly on a gearing edge of the gearwheel. More preferably, two force transducers, preferably of the same kind, can be formed or disposed on opposite end faces of the gearwheel.

The force transducer is preferably disposed in such a manner that no force transmission from the force transducer to the housing of the geared offset head means takes place in the axial direction, i.e., in particular along a rotation axis of the gearwheel.

The force transducer can be disposed or formed coaxially to the assigned gearwheel and/or rotationally symmetrical. The force transducer preferably has an outer diameter or a maximal radial extension which essentially corresponds to a root circle of the gearing of the assigned straight-toothed gearwheel. The force transducer preferably has a thickness of 1 mm to 5 mm, more preferably between 1 mm and 2.5 mm, extending in the axial direction.

In a preferred embodiment, the force transducer comprises integrated force sensor means which are configured to detect a compressive and/or a pulling force applied to the force transducer in a radial and/or tangential direction of the gearwheel or of the force transducer. The force sensor means are preferably disposed in a line of action of the resulting force applied to the gearwheel, the line of action extending in the radial direction.

The force sensor means preferably comprise at least one strain gauge which is attached to the force transducer. Preferably, at least two strain gauges are disposed on or attached to the force transducer. The strain gauges are preferably disposed on preferably opposite spokes or struts of the force transducer which extend in the radial direction. Alternatively or additionally, the force sensor means can also comprise piezo elements.

Alternatively or additionally, the force sensor means can comprise hydraulic or pneumatic pressure sensor means which are attached to the force transducer or connected thereto. Here, the force transducer can comprise at least one or preferably two appropriate chambers in the form of recesses or cavities, for example, in which a fluid suitable for the hydraulic or pneumatic sensor read-out is disposed or introduced. The chambers are preferably disposed opposite each other in the force transducer and are disposed in a respective half of the force transducer.

Additionally or alternatively, the force sensor means can comprise a polymer mass containing graphene and preferably having variable electrical conductivity, the polymer mass being attached to or integrated in the force transducer. For example, said polymer mass can be introduced into appropriate chambers in the form of recesses or cavities of the force transducer, for example, which are preferably disposed opposite each other in a respective half of the force transducer. The polymer mass is preferably formed by a viscoelastic polymer mass containing graphene, such as a bouncing putty based on silicone containing boron. Such a conductive polymer mass which has integrated particles or flakes made of graphene and which is exhibits variable electrical resistance in the case of changes in pressure on the polymer mass is known, cf. journal Science, Dec. 9, 2016, Vol. 354, edition 6317, pages 1257-1260.

The sensor means mentioned above can provide a measurement signal representing and/or monitoring the torque on the output side in a reliable manner and on a high level of measurement quality and accuracy for preferably electronic signal evaluation. The detection means can comprise means for the wireless signal transmission of a measurement signal which corresponds to the detected output torque and/or which monitors said output torque. Additionally, the detection means can comprise electronic interface and/or signal processing means and electrical energy supply means. The latter can be realized as electrical generator means which interact with a moving, in particular rotating, component of the geared offset head means.

The measurement signal provided by the detection means can be transmitted to a computing unit which is assigned to the screwing device or which can be connected thereto and which evaluates the detected signal and calculates or computes and/or monitors the respective output torque on the basis of the evaluation of the detected signal. This can be performed on the basis of comparative tables and/or database information, for example. Said comparative tables and/or database information can comprise measurement values of the detection means determined in test series, for example, and respective associated torque values by means of which the respective output torque can be calculated or computed and/or monitored on the basis of the provided measurement values. Here, the computing unit can be configured to detect a deviation from a definable target value and to emit an alarm or warning signal if the deviation is too large, for example preferably more than 10%, more preferably more than 5%.

The geared offset head means according to the invention are preferably closed or open geared offset head means. The geared offset head means can be designed with or without an angular gear. Moreover, the geared offset head means can comprise a spiral gearing, for example as part of an angular gear. Here, the detection means according to the invention can also be assigned to a gearwheel having a spiral gearing or can interact with said gearwheel to detect the radial and/or tangential force acting at the gearwheel.

Another aspect of the present invention relates to a preferably handheld or stationary screwing system comprising the screwing device as described above and drive torque generating means connected to the geared offset head means on the drive side. The drive torque generating means are preferably configured in the form of a manually operable or automatic screwdriver. The stationary screwing system refers preferably to a screwing system which is permanently installed in a manufacturing unit, for example a robot cell, and which can preferably be operated by an automatic controller.

BRIEF DESCRIPTION OF THE DRAWINGS

Further advantages, features and details of the invention are apparent from the following description of preferred exemplary embodiments and from the drawings; in the drawings.

DETAILED DESCRIPTION

Figure 1:
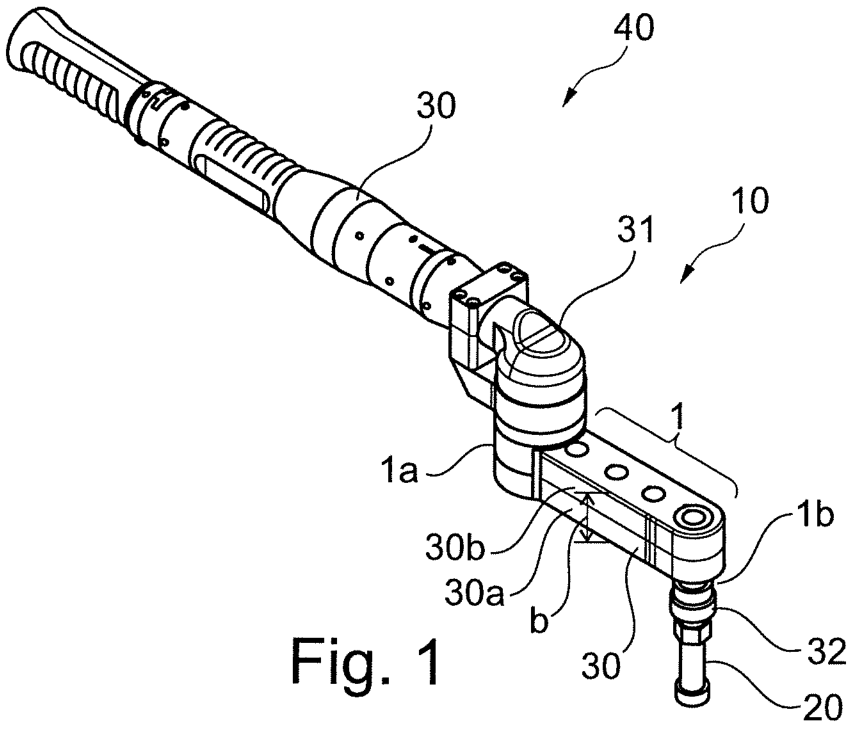
FIG. 1 shows a perspective view of the screwing system according to the invention according to a preferred exemplary embodiment of the invention.

FIG. 1 shows a preferred embodiment of screwing device 10 according to the invention for applying a torque to a screw partner 20, such as a screw. Screwing device 10 comprises geared offset head means 1 having an output 1*b* which can be connected to screw partner 20 in a detachable manner and a drive 1*a* to which a drive torque can be manually or mechanically applied, for example via an intermediate angle and/or bevel gearing 31.

Screwing device 10 can be connected to a screwing tool 30, preferably selectively, thereby forming screwing system 40 according to the invention. Screwing tool 30 can be a standard tool and can introduce a torque into geared offset head means 1 of screwing device 10 via angle and/or bevel gearing 31 by a motor, e.g. electrically or pneumatically. The drive torque thus introduced is transmitted to a tool 32 disposed as output 1*b* in the manner described below by geared offset head means 1 for the screwing operation of screw partner 20. Screwing device 10 comprises a flat housing 30 which is preferably formed by two housing halves 30*a*, 30*b* which have essentially the same shape. Housing 30 preferably has a maximal height or width b of 30 mm, more preferably of 20 mm.

Figure 2:
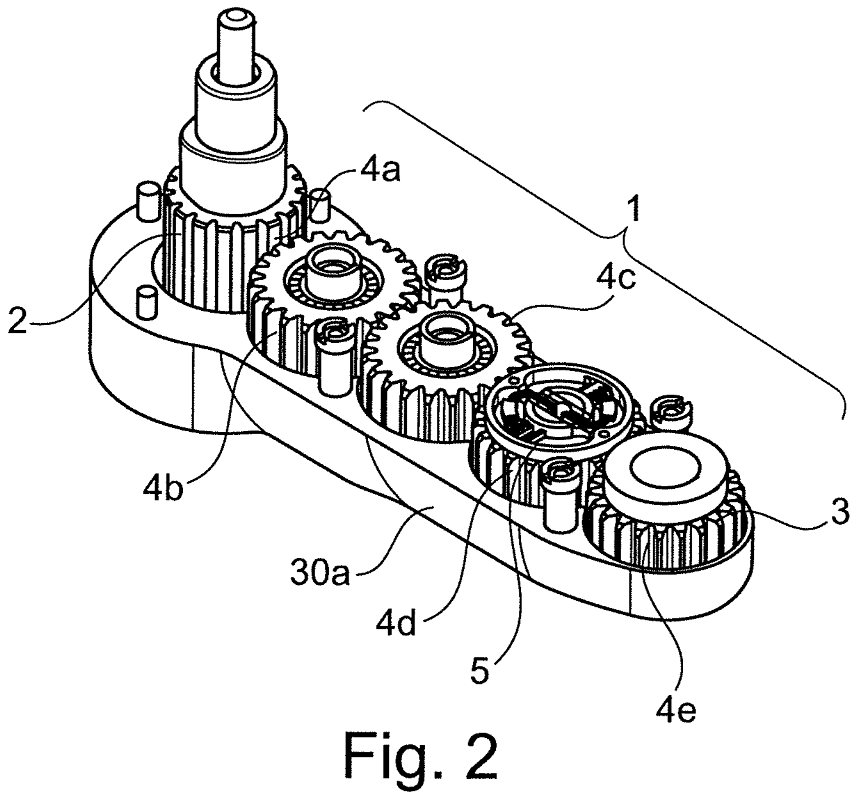
FIG. 2 shows a perspective view of the geared offset head means according to the invention in which the housing is partially removed.

FIG. 2 shows a perspective view of geared offset head means 1 according to the invention in which the housing is partially removed. Geared offset head means 1 comprise a drive assembly 2 for the interaction with angle and/or bevel gearing 31 provided on the drive side, for example, and an output assembly 3 for the interaction with screw partner 20, for example via a tool 32 which is connected thereto and which is disposed on the output side.

Geared offset head means 1 preferably comprise a plurality of gearwheels 4*a*, 4*b*, 4*c*, 4*d*, 4*e* which form a gear arrangement between drive 1*a* and output 1*b* of geared offset head means 1. The gearwheels are preferably straight-toothed gearwheels which realize a 1:1 gear ratio, for example. As an alternative to the illustration in FIG. 2, the gearwheels can also be realized as helical gearwheels. A deviating gear ratio can also be realized.

The gearwheels are preferably disposed axially parallel in housing 30 and extend linearly along a longitudinal extension of housing 30 in which they are disposed so as to be rotatable. Drive assembly 2 or output assembly 3 can comprise some of the gearwheels. Preferably, drive assembly 2 and output assembly 3 each comprise one gearing or one gearwheel 4*a*, 4*e* which is in operative connection with the other gearwheels of the gear arrangement. In particular, drive assembly 2 and output assembly 3 can each be formed by one gearwheel 4*a*, 4*e*.

In a typical realization of a manual screwing operation, such geared offset head means 1 are provided and suitable for the transmission of a maximal torque of approx. 200 Nm. A usual efficiency of such a straight-toothed gear arrangement is between approx. 85% and 95% (i.e., the ratio of a torque at 4*e* on the output side to a torque at 4*a* on the drive side), depending on the lubrication conditions and the exact design of the gearings.

Detection means 5 are disposed between drive assembly 2 and output assembly 3, detection means 5 being configured to provide measurement values for determining and/or monitoring an output torque acting on screw partner 20 on the output side. Detection means 5 are assigned to a preferably straight-toothed gearwheel 4*d* or are in operative connection with it. Gearwheel 4*d* connected to detection means 5 preferably meshes with gearwheel 4*e* of output assembly 3. Alternatively, gearwheel 4*d* connected to detection means 5 can be directly comprised by output assembly 3 or can form it.

Figure 6:
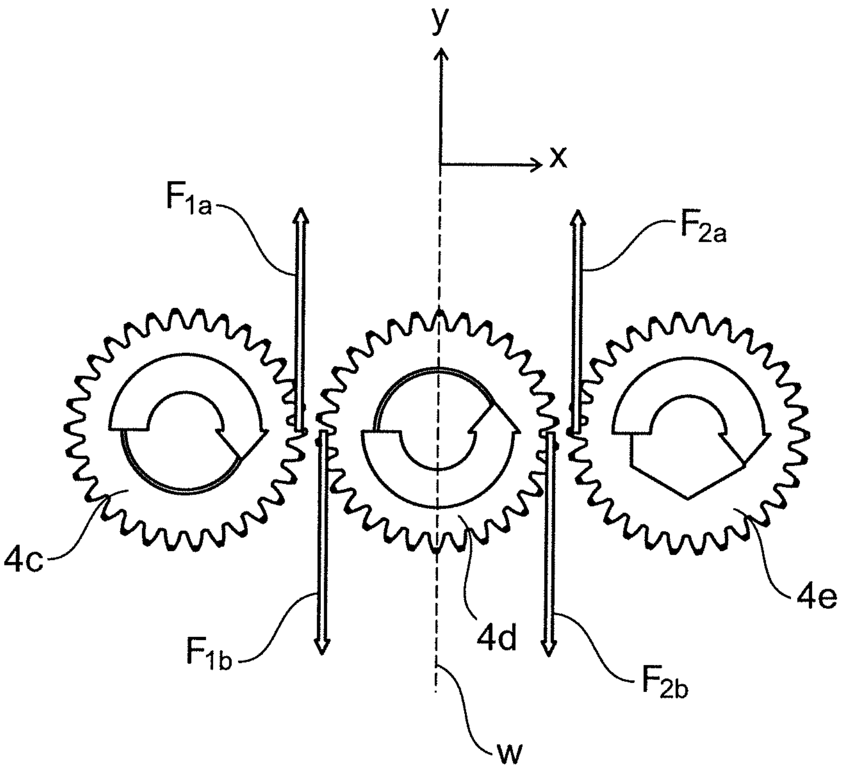
FIG. 6 shows an exemplary schematic drawing of the forces applied to the gearwheel interacting with the detection means.

FIG. 6 shows a schematic diagram in which the linear arrangement of straight-toothed gearwheel group 4*c*, 4*d*, 4*e* illustrated in FIG. 2 is schematically illustrated. The free body diagram of meshing gearwheels 4*c*, 4*d*, 4*e* shown as an example in this figure shows that respective tangential or circumferential forces $F_{1a}$, $F_{1b}$ and $F_{2a}$, $F_{2b}$ act in the shown Y direction in the gearing engagement and thus extend essentially orthogonal to an extension direction X of gear arrangement 4*c*, 4*d*, 4*e*. The force origin in the gearing engagement is shown on both sides of center gearwheel 4*d* as an example. The magnitude of the forces differs only in a possible efficiency loss within a gearwheel stage. If the two circumferential forces $F_{1a}$, $F_{1b}$ and $F_{2a}$, $F_{2b}$ acting in the same direction are combined to obtain a resulting force, their line of action W is almost in the center of gearwheel 4*d*. Hence, detection means 5 according to the invention are preferably disposed in the line of action of the resulting force applied to gearwheel 4*d* or are disposed in such a manner that they can detect the forces occurring in or along the line of action.

Figure 3A:
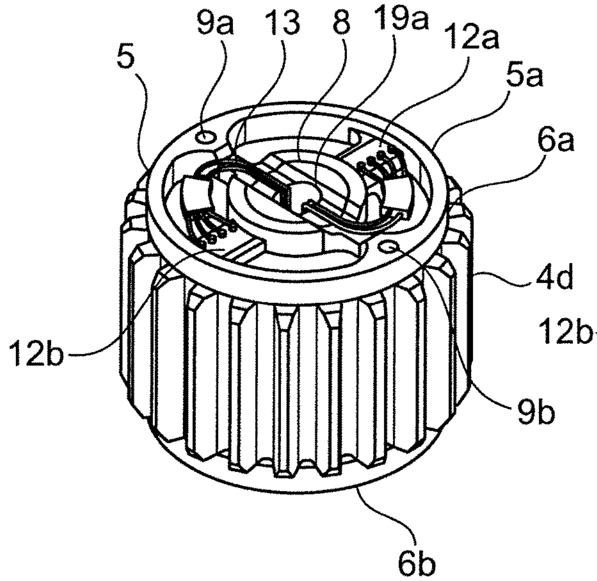
FIG. 3*a* shows a perspective view of a gearwheel interacting with the detection means.

FIG. 3*a* shows a perspective view of gearwheel 4*d* and of corresponding or assigned detection means 5.

Figure 3B:
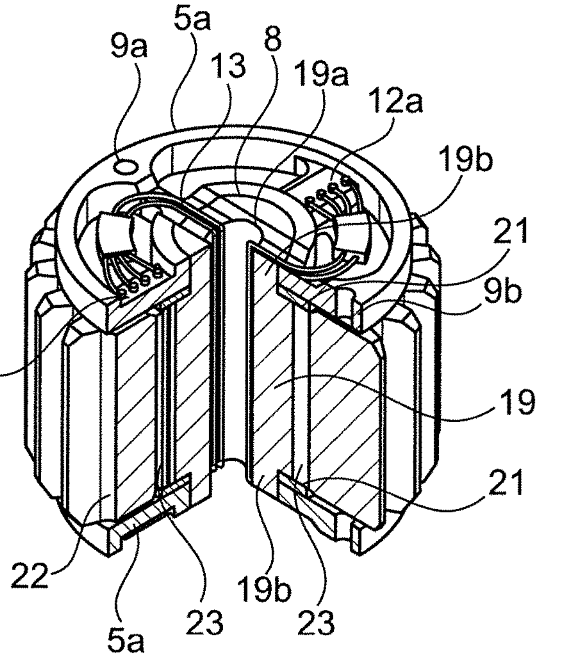
FIG. 3*b* shows a partial sectional view of the gearwheel according to FIG. 3*a;*
Figure 3C:
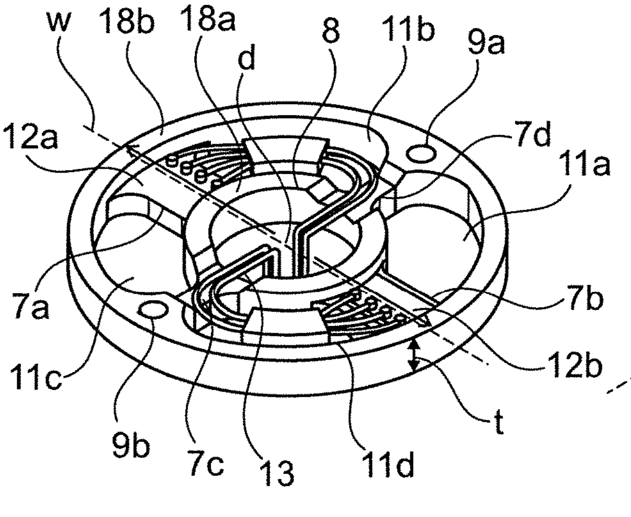
FIG. 3*c* shows a perspective view of the force transducer according to FIGS. 3*a* and 3*b;*
Figure 3D:
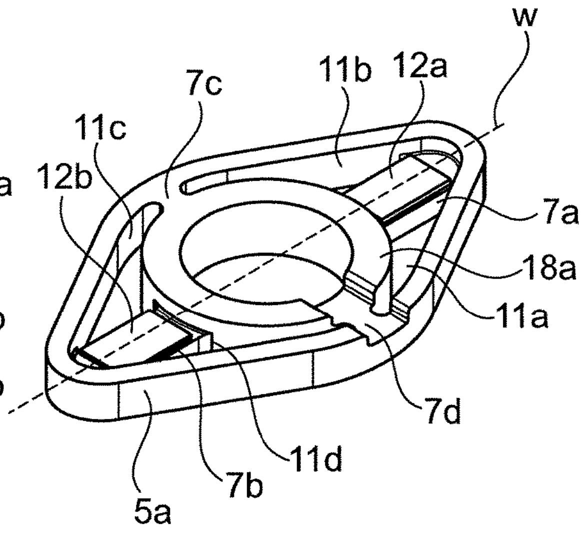
FIG. 3*d* shows a perspective view of an alternative realization of the force transducer.

Detection means 5 comprise a preferably essentially disk-shaped force transducer 5*a* in the form of a spoke wheel (see also FIG. 3*c*), for example, which is formed integrally with a rotation axis 19 of gearwheel 4*a* and/or firmly connected thereto, in particular in a non-rotatable manner. Furthermore, force transducer 5*a* is mounted in housing 30*a*, 30*b* in a non-rotatable manner, for example by means of axially disposed bores 9*a*, 9*b* and connection pins (not shown) accommodated therein. As an alternative to this configuration, force transducer 5*a* can be mounted in the housing in a form-secured manner. In this case, force transducer 5*a* can have an external shape (cf. FIG. 3*d*) which is essentially trapezoidal, for example, and which can be accommodated or mounted in a corresponding recess of housing 30*a*, 30*b* in a non-rotatable manner.

Force transducer 5*a* is preferably disposed on an end face 6*a* of gearwheel 4*d* or of rotation axis 19 of gearwheel 4*d*. Detection means 5 preferably have two force transducers 5*a*, preferably of the same kind, which are disposed on two opposite end faces 6*a*, 6*b* of gearwheel 4*a* or of rotation axis 19 of gearwheel 4*d* (cf. FIG. 3*b*).

Gearwheel 4*d* preferably comprises central rotation axis 19 which has a bore 19*a* disposed therein and configured for the preferably non-rotatable arrangement in geared offset head means 1 and/or for the guiding of sensor lines or wiring 13 assigned to detection means 5. Axis 19 preferably has a portion 19*b*, preferably at both ends, which protrudes in the axial direction and which is configured to mount and/or to connect the at least one force transducer 5*a*. Portion 19*b* can in particular engage into a central bore 8 of force transducer 5*a*, preferably in a non-rotatable manner. A spacer or drilling disk 21 can be disposed between force transducer 5*a* and a main axis body of axis 19. A ring gear 22 of gearwheel 4*d* is disposed so as to be freely rotatable on axis 19, preferably by means of a needle bearing 23.

Force transducer 5*a* comprises a central bore 8 for connecting force transducer 5*a* to rotation axis 19 and/or for guiding sensor lines 13. Force transducer 5*a* preferably has a circular outer contour. An outer diameter d or a maximal radial extension of force transducer 5*a* is preferably smaller or essentially corresponds to the root circle of gearwheel 4*d*. A thickness t of force transducer 5*a* is preferably between 1 mm and 5 mm, more preferably between 1 mm and 2.5 mm.

Force transducer 5*a* comprises at least two preferably opposite radial struts or bars 7*a*, 7*b* and preferably essentially arc-shaped intermediate recesses 11*a*, 11*b*, 11*c*, 11*d*. Force transducer 5*a* can be formed by an inner circle 18*a* and an outer circle 18*b* formed coaxially therewith and having struts or bars 7*a*, 7*b*, 7*c*, 7*d* extending in the radial direction.

Force transducer 5*a* comprises force sensor means which are integrated therein or attached thereto and which are configured to detect a compressive and/or pulling force applied to the force transducer and therefore to bearing axis 19 connected thereto for co-rotation as a bearing reaction force in a radial and/or tangential direction in relation to gearwheel 4*d*. In the embodiment shown in FIGS. 3*a*-3*c*, the force sensor means are formed by strain gauges 12*a*, 12*b* which are attached to force transducer 5*a*. Said strain gauges

12*a*, 12*b* are disposed on preferably opposite struts 7*a*, 7*b* of force transducer 5*a*, which extend in the radial direction, and can thus detect in particular a compressive and/or pulling force acting in these struts when assigned gearwheel 4*d* interacts with gearwheels 4*c*, 4*e* meshing with it. Struts 7*a*, 7*b* or force sensor means 12*a*, 12*b* are preferably disposed along or parallel to a line of action W of the resulting force applied to gearwheel 4*d* in the respective gear arrangement (cf. also FIG. 6).

A signal provided for subsequent processing and evaluation in a conventional and known manner can be emitted by sensor wiring 13. Preferably, a voltage change as a result of an elastic deformation by radial forces is generated by the strain gauges as force sensor means, the voltage change being provided for electronic signal evaluation and in particular for the determination and/or monitoring of a torque on the output side. To emit the measurement signal for electronic signal evaluation, the device can also have means (not shown) for the wireless signal transmission. The signal evaluation can be performed by means of computing means (not shown) which are assigned to the device or which can be connected thereto, the computing means calculating or monitoring the corresponding or applied torque on the basis of an emitted voltage signal, for example. For example, this can be performed on the basis of comparative tables stored in a database. Since gearwheel 4*d* and force transducer 5*a* according to the invention which is connected thereto mesh directly with gearing 4*a* of output assembly 3, which in turn directly introduces the output torque into screw partner 20 for the purpose of screwing, the force sensor signal can represent or monitor the actual torque ratios on the output side of the geared offset head means in a very accurate, interference-free and reproducible manner in order to attain the object according to the invention; the loss of this torque pairing is negligible.

Figure 4A:
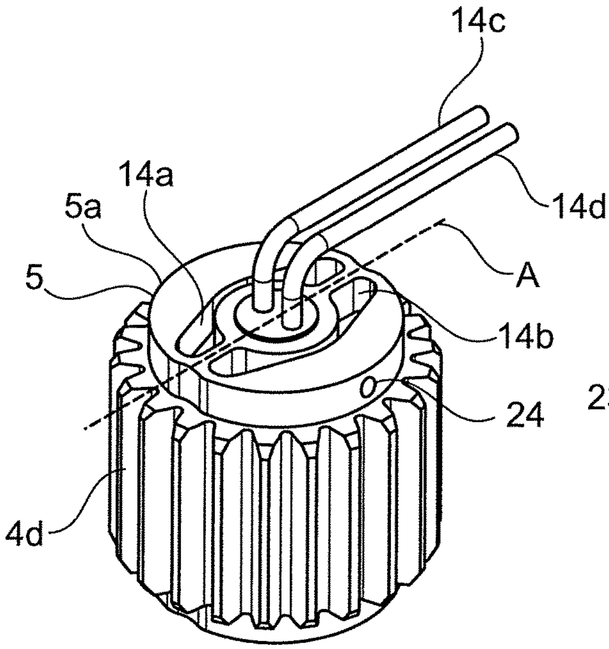
FIG. 4*a* shows a perspective view of another preferred embodiment of the gearwheel interacting with the detection means, the detection means comprising hydraulic or pneumatic pressure sensor means.
Figure 4B:
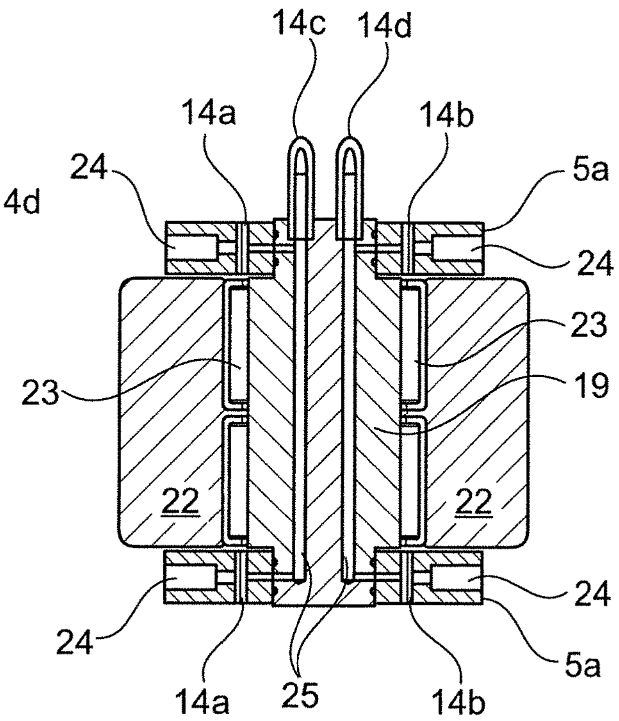
FIG. 4*b* shows a sectional view of the gearwheel interacting with the detection means according to FIG. 4*a;*

FIGS. 4*a* and 4*b* show another preferred embodiment of detection means 5 according to the invention, force transducer 5*a* comprising hydraulic or pneumatic pressure sensor means. In particular, force transducer(s) 5*a* comprise(s) at least one or preferably two appropriate chambers 14*a*, 14*b* in the form of recesses or cavities in which an appropriate fluid is disposed or introduced. Chambers 14*a*, 14*b* are preferably disposed opposite each other in force transducer 5*a* and mirrored along an axis A which divides force transducer 5*a* into two halves. A hydraulic or pneumatic pressure change in chambers 14*a*, 14*b* occurring as a result of the interaction of gearwheel 4*d* with gearwheels 4*c*, 4*e* meshing therewith can be detected by means of appropriate pressure sensors which are assigned to chambers 14*a*, 14*b*. Transmission to pressure sensors which are disposed externally in relation to force transducer 5*a* can be performed by means of appropriate lines 14*c*, 14*d*. Chambers 14*a*, 14*b* can each comprise a filling and/or ventilation opening 24 which can be selectively closed by means of a corresponding plug (not shown). A corresponding electronic signal emission can then be performed by the sensor means; the torque which is applied to gearwheel 4*d* can be deduced from said signal emission.

As shown in FIG. 4*b*, detection means 5 preferably comprise two force transducers 5*a* which are disposed on the two end faces 6*a*, 6*b* of gearwheel 4*d* or of rotation axis 19. As shown in said figure, respective chambers 14*a*,14*b* are preferably connected or coupled by means of channels 25 which are preferably formed in rotation axis 19 or guided therein.

Figure 5:
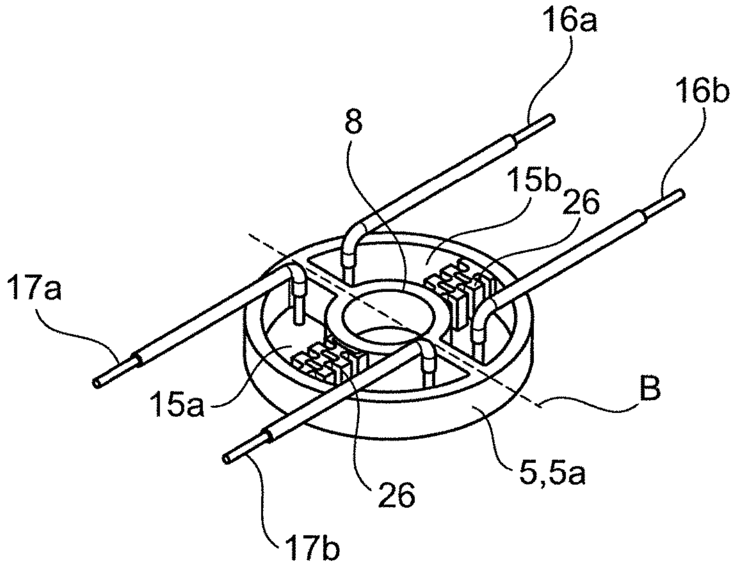
FIG. 5 shows a perspective view of another preferred embodiment of the force transducer according to the invention having sensor means comprising a polymer mass containing graphene and having variable electrical conductivity.

FIG. 5 shows another preferred embodiment of detection means 5 according to the invention, force transducer 5*a* comprising a polymer mass containing graphene and having variable electrical conductivity as sensor means. In particular, force transducer 5*a* comprises at least one or preferably two appropriate chambers 15*a*, 15*b* in the form of recesses or cavities in which the polymer mass containing graphene is introduced and which are each contacted by corresponding electrical lines 16*a*, 16*b* and 17*a*, 17*b*. Chambers 15*a*, 15*b* are preferably mirrored along an axis B which divides force transducer 5*a* into two halves. Spring elements 26 extending in the radial direction are preferably disposed within chambers 15*a*, 15*b* as supporting structural elements.

The electrical conductivity of the polymer mass containing graphene changes when a torque is applied to gearwheel 4*d* and thus when a reaction force occurs on force transducer 5*a* which interacts with gearwheel 4*d*; in this way, a sensor signal depending on the torque can be emitted for electronic signal evaluation.

The embodiments described above are merely exemplary, the invention being by no means limited to the embodiments shown in the figures. In particular, the shown exemplary embodiments can also be combined with one another.

The invention claimed is:

1. A screwing device (10) for applying a torque to a screw partner (20), the screwing device (10) comprising geared offset head means (1) having an output (1*b*) which can be connected to the screw partner (20) in a detachable manner and a drive (1*a*) to which a drive torque can be manually or mechanically applied, and detection means (5), provided in a housing (30) of the geared offset head means (1), for providing measurement values for determining or monitoring an output torque acting on the screw partner on the output side, wherein the detection means (5) are configured in such a manner that they can detect a radial force or a tangential force which acts on a gearwheel (4*d*) which connects the drive and the output of the geared offset head means (1) in a torque-transmitting manner, and wherein the detection means (5) can provide at least one of the radial or tangential force for electronic signal evaluation, and wherein the detection means (5) comprise at least one essentially disk-shaped force transducer (5*a*) comprising integrated force sensor means which are configured to detect at least one of a compressive force or a pulling force applied to the force transducer (5*a*) in at least one of a radial direction or a tangential direction, wherein the integrated force sensor means are formed by strain gauges (12*a*, 12*b*) which are attached to the force transducer (5*a*) and which are disposed on opposite struts (7*a*, 7*b*) of the force transducer (5*a*) which extend in the radial direction, or the integrated force sensor means are formed by a polymer mass (15*a*, 15*b*) containing graphene and having variable electrical conductivity, the polymer mass (15*a*, 15*b*) being attached to or integrated in the force transducer (5*a*).

2. The device according to claim 1, wherein the geared offset head means (1) comprise the gearwheel (4*d*), which interacts with the detection means (5) between a drive assembly (2), which has a gearing and which forms the drive (1*a*), and an output assembly (3) , which has a gearing and which forms the output (1*b*), or wherein an output assembly (3) comprises the gearwheel (4*d*) which interacts with the detection means (5).

3. The device according to claim 1, wherein the geared offset head means (1) comprise a plurality of gearwheels (4*a*, 4*b*, 4*c*, 4*d*, 4*e*) which form a gear arrangement between the drive (1*a*) and the output (1*b*).

4. The device according to claim 3, wherein the gearwheel (4*d*) interacting with the detection means (5) is one of the gearwheels (4*a*, 4*b*, 4*c*, 4*d*, 4*e*) forming the gear arrangement.

5. The device according to claim 1, wherein the geared offset head means (1) comprise a plurality of gearwheels.

6. The device according to claim 5, wherein the plurality of gearwheels (4*a*, 4*b*, 4*c*, 4*d*, 4*e*) have rotation axes extending in a common plane.

7. The device according to claim 1, wherein the at least one force transducer (5*a*) is disposed in a line of action (W) of the resulting force applied to the gearwheel (4*d*) , the line of action (W) extending radially to the gearwheel.

8. The device according to claim 7, wherein the force transducer (5*a*) is disposed on an end face (6*a*) of the gearwheel and coaxially thereto and/or wherein the force transducer (5*a*) has a maximal outer diameter (d) or a maximal radial extension which essentially corresponds to a root circle of the gearwheel (4*d*).

9. The device according to claim 7, wherein the force transducer (5*a*) is firmly connected to or integrally formed with a bearing (19) of the gearwheel (4*d*).

10. The device according to claim 1, wherein the integrated sensor means are formed by hydraulic or pneumatic pressure sensor means (14*a*, 14*b*) which are attached to the force transducer (5*a*) or connected thereto.

11. The device according to claim 1, wherein the detection means (5) comprise means for the wireless signal transmission of a measurement value signal which corresponds to the detected output torque and/or which monitors said output torque.

12. The device according to claim 1, wherein the detection means (5) comprise electronic interface and/or signal processing means and electrical energy supply means.

13. The device according to claim 12, wherein the electrical energy supply means are realized as electrical generator means which interact with a moving component of the geared offset head means.

14. The device according to claim 13, wherein the moving component of the geared offset head means is a rotating component of the geared offset head means.

15. A handheld or stationary screwing system (40) comprising the screwing device (10) according to claim 1 and drive torque generating means (30) connected to the geared offset head means on the drive side.

16. The device according to claim 1, wherein the drive torque can be applied by the drive (1*a*) via an intermediate angle and/or bevel gearing (31), wherein the gearwheel (4*d*) is a straight-toothed gearwheel, and wherein the signal evaluation is electronic signal evaluation.

17. The device according to claim 11, wherein the polymer mass comprises a viscoelastic polymer mass containing graphene.

* * * * *